US007242129B2

(12) United States Patent
Kim et al.

(10) Patent No.: US 7,242,129 B2
(45) Date of Patent: Jul. 10, 2007

(54) PIEZOELECTRIC AND ELECTROSTATIC MICROELECTROMECHANICAL SYSTEM ACTUATOR

(75) Inventors: Ki Chul Kim, Daejeon (KR); Sang Hyeob Kim, Daejeon (KR); Hye Jin Kim, Daejeon (KR); Doo Hee Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 166 days.

(21) Appl. No.: 11/157,745

(22) Filed: Jun. 21, 2005

(65) Prior Publication Data

US 2006/0131997 A1 Jun. 22, 2006

(30) Foreign Application Priority Data

Dec. 16, 2004 (KR) ...................... 10-2004-0107033

(51) Int. Cl.
*H02N 1/00* (2006.01)

(52) U.S. Cl. .................... 310/309; 310/331; 360/294.4

(58) Field of Classification Search ................ 310/309, 310/311; 360/294.4, 291.9, 292
See application file for complete search history.

(56) References Cited

U.S. PATENT DOCUMENTS 5,223,762 A 6/1993 Masaie et al. .......... 310/313 D
6,108,175 A 8/2000 Hawwa et al. ........... 360/214.4
6,472,794 B1 * 10/2002 Shibaike et al. ............ 310/309
6,483,056 B2 * 11/2002 Hyman et al. .............. 200/181
6,629,461 B2 * 10/2003 Behin et al. ............. 73/514.16
6,870,710 B2 3/2005 Hida et al. ............... 360/294.4
2002/0089254 A1 7/2002 Dausch et al. .............. 310/311
2004/0075366 A1 4/2004 Mehta ........................ 310/336
2005/0162040 A1 * 7/2005 Robert ....................... 310/322
2006/0131997 A1 * 6/2006 Kim et al. .................. 310/328
2006/0146392 A1 * 7/2006 An et al. .................... 359/291

FOREIGN PATENT DOCUMENTS

JP 5147762 6/1993
JP H05-284765 10/1993
JP 11 14634 1/1999
JP H11-322424 11/1999
JP 2004-260994 9/2004
KR 10-2004-0020305 3/1994
WO WO 03/098714 11/2003

* cited by examiner

*Primary Examiner*—Karl Tamai
(74) *Attorney, Agent, or Firm*—Ladas & Parry LLP

(57) ABSTRACT

Provided is a microelectromechanical system (MEMS) actuator in which a cantilever piezoelectric actuator and a comb actuator are combined to perform dual shaft drive. The MEMS includes: a stationary comb fixed on a substrate; a movable comb disposed separately from the substrate; and a spring connected to the movable comb and the substrate to resiliently support the movable comb, wherein the movable comb includes a piezoelectric material layer in a laminated manner to be perpendicularly moved by a piezoelectric phenomenon and laterally moved by an electrostatic force to the stationary comb, whereby the MEMS actuator can be used in a driving apparatus of an ultra-slim optical disk drive since the movable comb is made of a piezoelectric material to simultaneously perform focusing actuation to a Z-axis as well as planar actuation.

7 Claims, 4 Drawing Sheets

PIEZOELECTRIC AND ELECTROSTATIC MICROELECTROMECHANICAL SYSTEM ACTUATOR

CROSS-REFERENCE TO RELATED APPLICATION

This application claims priority to and the benefit of Korean Patent Application No. 2004-107033, filed Dec. 16, 2004, the disclosure of which is incorporated herein by reference in its entirety.

BACKGROUND

1. Field of the Invention

The present invention relates to a microelectromechanical system (MEMS) actuator and, more particularly, to a MEMS actuator that a cantilever piezoelectric actuator and a comb actuator are combined to perform dual shaft drive. The MEMS actuator can be used in a driving apparatus of an ultra-slim optical disk drive.

2. Discussion of Related Art

A conventional actuator used in an optical pickup driving apparatus is a voice coil motor (VCM) actuator including a magnetic circuit for applying a magnetic flux to a coil to generate a Lorentz force, a bobbin for fixing the coil and optical parts, a wire suspension for supporting the bobbin and damping vibrations transmitted to the bobbin, and a printed circuit board (PCB) for transmitting input and output signals of a servo system and supplying current to the coil. However, it is difficult to manufacture the conventional VCM actuator in an ultra-small size due to a structure that the bobbin for winding the coil, a support member for supporting the bobbin, and the magnetic circuit including a magnet, a yoke plate and so on should be required.

A single shaft control ultra-small actuator mainly uses a MEMS comb actuator or a cantilever piezoelectric actuator depending on purpose.

The comb actuator using an electrostatic force applies a voltage to a pair of combs perpendicularly projected from a planar surface and inserted into each other so that the electrostatic force generated between the two combs uniformly produces power depending on relative movement between the combs. The electrostatic comb-drive actuator has an advantage of providing uniform power with respect to movement of one comb.

The cantilever piezoelectric actuator is manufactured mostly using PZT ceramic, and used in various fields that a microscopic location control apparatus is required. This actuator has an advantage capable of readily performing precise control since displacement of the actuator is determined depending on a driving voltage applied to a piezoelectric material. In particular, it is possible to compose the ultra-fine actuator since its displacement can be controlled by tens of nanometers. The cantilever piezoelectric actuator has been used for obtaining and controlling ultra-fine driving force such as driving force of an atomic force microscope (AFM), a nano drive actuator, a MEMS structure and so on.

However, the conventional actuators have disadvantages that only single shaft can be controlled, its application range is limited, especially, the piezoelectric actuator should have high drive voltage in order to obtain large displacement using the PZT ceramic, and therefore, it is difficult to manufacture the actuators in a small size.

SUMMARY OF THE INVENTION

The present invention is directed to an ultra-small dual shaft control MEMS actuator that can be used in an ultra-small mobile driving apparatus requiring dual shaft control.

The present invention is also directed to an ultra-small MEMS actuator capable of adapting a semiconductor manufacturing process, different from a conventional VCM actuator.

The present invention is also directed to an actuator capable of simultaneously performing tracking and focusing drive by adapting a cantilever beam single crystalline piezoelectric actuator as a drive part of a comb actuator, being one-step advanced from the piezoelectric actuator located at a center portion of a conventional head to perform the tracking drive only.

The present invention is also directed to an actuator capable of performing focusing drive of large displacement even at a low voltage.

One aspect of the present invention is to provide a MEMS actuator including: a stationary comb fixed on a substrate; a movable comb disposed separately from the substrate; and a spring connected to the movable comb and the substrate to resiliently support the movable comb, wherein the movable comb includes a piezoelectric material layer in a laminated manner to be perpendicularly moved by piezoelectric phenomenon and laterally moved by electrostatic force to the stationary comb.

Preferably, the movable comb includes metal coating layers, and the piezoelectric material layer interposed between the metal coating layers, and the MEMS actuator may further include a post for fixing the stationary comb on the substrate.

In addition, the stationary comb and the movable comb including the piezoelectric material layer have an advantage that the MEMS actuator can be manufactured by a more simple process. Preferably, the piezoelectric material layer may use one of a piezoelectric ceramic layer and a piezoelectric single crystalline layer, the piezoelectric material layer may use tone selected from PZT ceramic, PMN-PT ($Pb(Mg_{1/3}Nb_{2/3})O_3$—$PbTiO_3$) ceramic, and PZN-PT($Pb(Zn_{1/3}Nb_{2/3})O_3$—$PbTiO_3$) ceramic, and the piezoelectric single crystalline layer may use one of a PMN-PT single crystal and a PZN-PT single crystal.

Meanwhile, the spring supporting the movable comb may be formed at only one end of the movable comb to move the other end of the movable comb using the spring as a shaft to thereby increase mobility of the movable comb.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
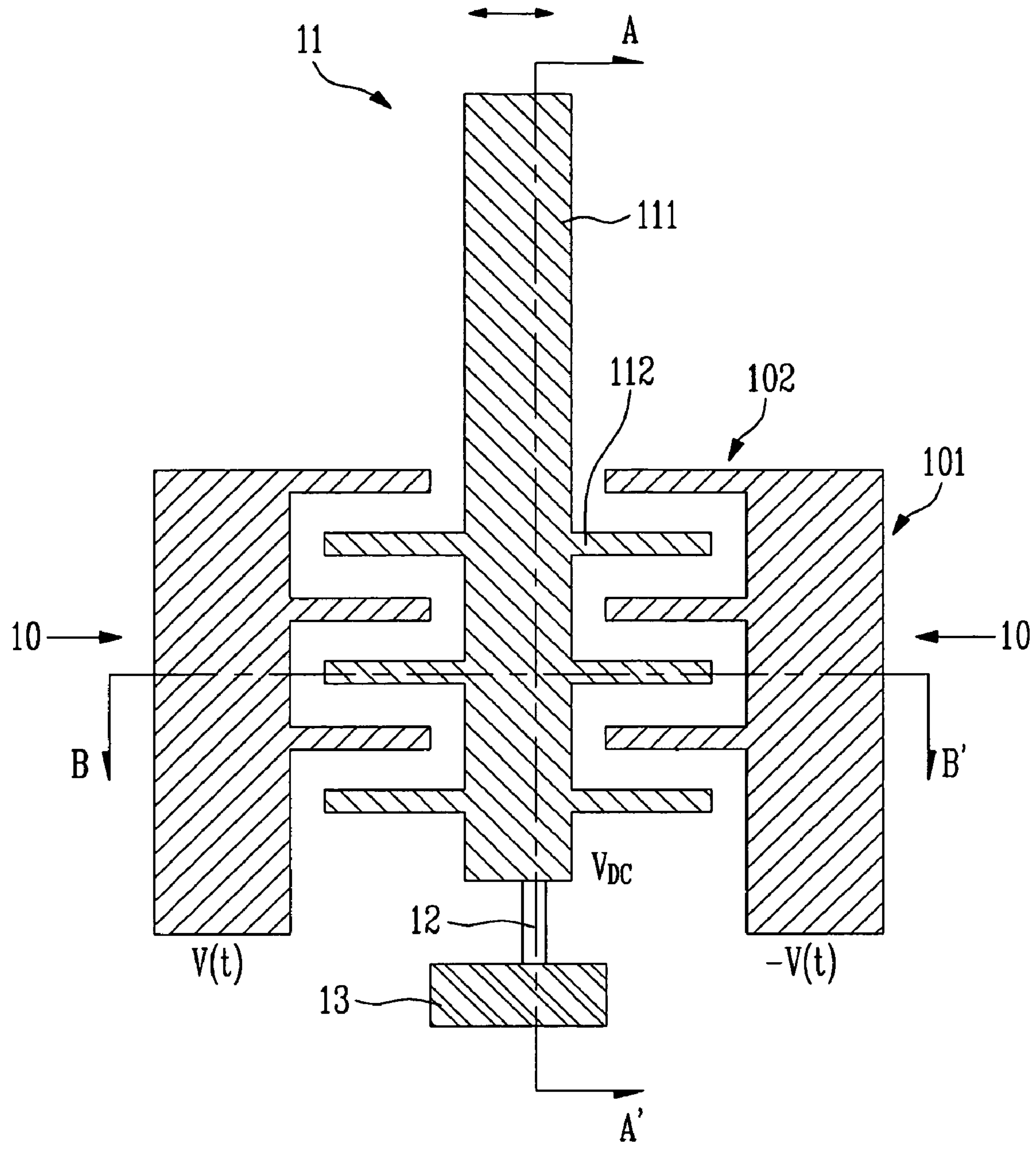
FIG. 1 is a schematic plan view of a MEMS actuator in accordance with an embodiment of the present invention.
Figure 2:
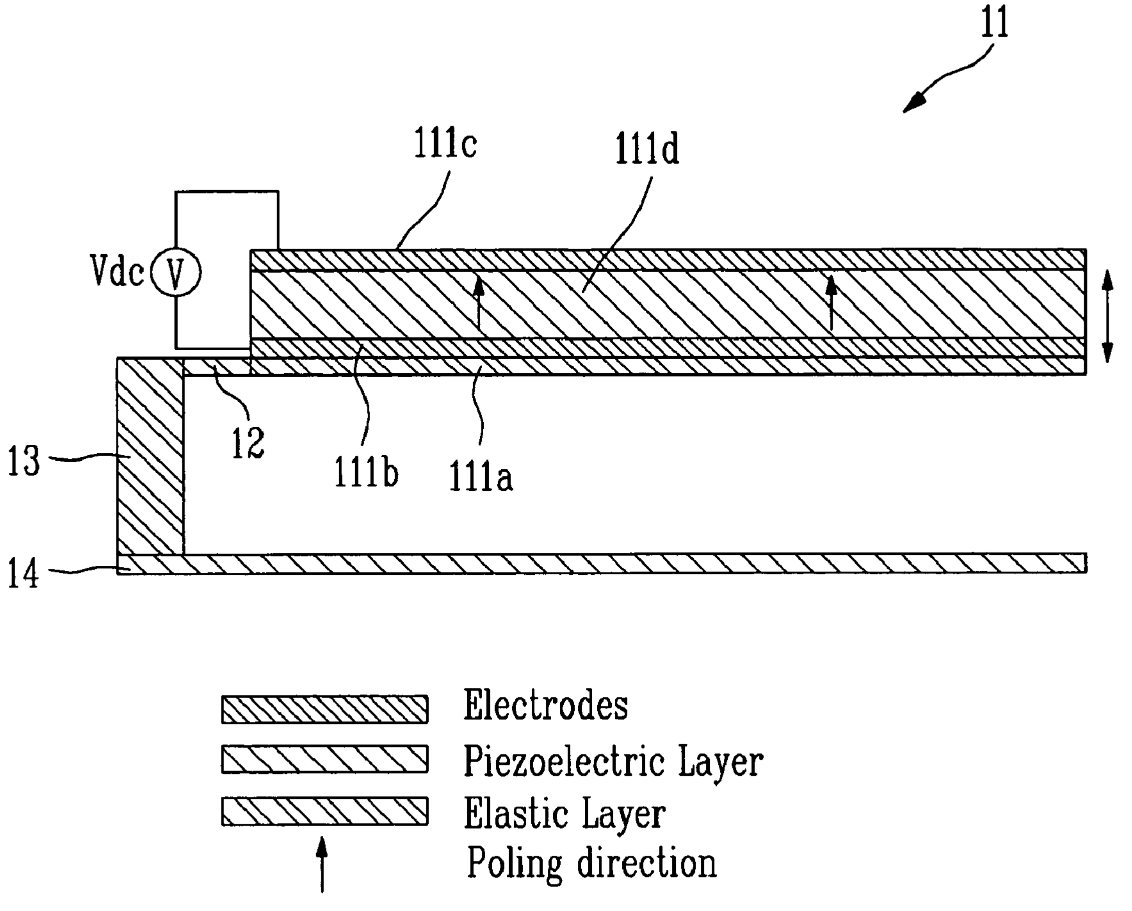
FIGS. 2 and 3 are cross-sectional views taken along the lines AA' and BB' of the MEMS actuator shown in FIG. 1, respectively.
Figure 3:
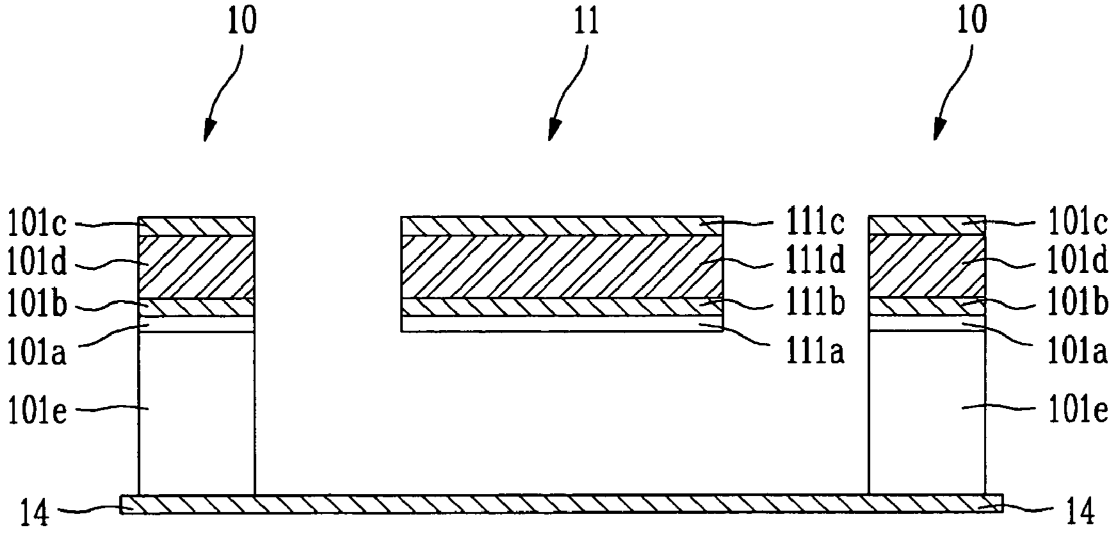

FIG. 1 is a schematic plan view of a MEMS actuator in accordance with an embodiment of the present invention, and FIGS. 2 and 3 are cross-sectional views taken along the lines AA' and BB' of the MEMS actuator shown in FIG. 1, respectively.

Referring to FIG. 1, the MEMS actuator includes a stationary comb 10 fixed on a substrate (not shown), a movable comb 11 disposed separately from the substrate, and a spring 12 connected to the movable comb 11 and the substrate to movably support the movable comb 11. The movable comb 11 includes a piezoelectric material layer formed in a laminated manner to be perpendicularly moved by a piezoelectric phenomenon, and laterally moved by an electrostatic force to the stationary comb. The piezoelectric material may use one of a piezoelectric ceramic layer and a piezoelectric single crystalline layer. The piezoelectric ceramic layer may use one selected from PZT ceramic, PMN-PT($Pb(Mg_{1/3}Nb_{2/3})O_3$—$PbTiO_3$) ceramic, and PZN-PT($Pb(Zn_{1/3}Nb_{2/3})O_3$—$PbTiO_3$) ceramic, and the piezoelectric single crystalline layer may use one of a PMN-PT single crystal and a PZN-PT single crystal.

More specifically describing, the stationary comb 10 is disposed at both sides of the movable comb 11 separated from the substrate and alternately inserted to be spaced apart from the movable comb 11. In addition, a post 13 may be additionally installed in order to fix the spring 12 and the substrate. That is, the spring 12 spaced apart from the substrate is connected to the post 13 to movably and resiliently support the movable comb 11.

The piezoelectric material layer of the movable comb 11 is made of a piezoelectric single crystalline material or a piezoelectric ceramic material to produce a piezoelectric phenomenon. For the convenience of the manufacturing process, the stationary comb 10, the post 13 and the spring 12 may also include an insulating material formed in a laminated manner and having piezoelectric characteristics. In this case, the stationary comb 10, the post 13 and the spring 12 are configured not to produce the piezoelectric phenomenon since a voltage difference is not applied between upper and lower parts of the insulating material layer. The stationary comb 10, the movable comb 11, the post 13 and the spring 12 may include an insulating material layer (not shown) formed on the substrate in a laminated manner.

The post 13 is spaced apart from the movable comb 11 to be disposed at one side of the movable comb 11 and fixed to a silicon substrate. The other side of the movable comb 11, at which the post 13 is not disposed, can be readily moved.

The stationary comb 10 includes, for example, a stationary stage 101 fixed to the silicon substrate, and a plurality of stationary fingers 102 projected from one side of the stationary stage 101 in a comb shape. The movable comb 11 is spaced apart from the silicon substrate to be straightly moved, and includes a plurality of movable fingers 112 projected from both sides of a movable stage 111 in a comb shape. Here, the movable stage 111 faces the plurality of stationary fingers 102.

The stationary comb 10 and the movable comb 11 are physically and electrically separated from each other, and the stationary fingers 102 and the movable fingers 112 are alternately inserted to be spaced apart from each other. A voltage is applied between the pair of combs alternately inserted into each other to allow the electrostatic force generated between the two combs to uniformly produce power with respect to relative movement between the both combs.

The spring 12 is disposed between the post 13 and the movable comb 11, and separated from the silicon substrate. That is, one end of the spring 12 is connected to the post 13, and the other end is connected to one end of the movable comb 11, thereby resiliently supporting the movable comb 11.

FIGS. 2 and 3 are cross-sectional views taken along the lines AA' and BB' of the MEMS actuator shown in FIG. 1, respectively.

The movable comb 11 is formed on a substrate 14 in a floated manner, and includes an elastic layer 111*a*, a lower electrode 111*b*, an insulating material 111*d* having piezoelectric characteristics, and an upper electrode 111*c*. Conductive metal coating layers are formed of the lower and upper electrodes 111*b* and 111*c*. Preferably, the metal coating layer is made of one of Al and Au. The movable comb 11, the post 13 for fixing the substrate 14, and the spring 12 for resiliently supporting the post 13 and the movable comb 11 may be made of a silicon material.

While the substrate is preferably a silicon substrate, it is possible to substitute with a substrate made of a different material, for example, a glass substrate, having good machining characteristics, for the silicon substrate. Upper electrodes 111*c* and 101*c* are formed on the insulating material of the stationary comb 10 and the movable comb 11 to apply a voltage. In this case, when the voltage is not applied to a lower electrode 101*b* of the stationary comb 10, a voltage difference is not applied to a piezoelectric material layer 101*d*. Since the lower electrode 101*b* of the stationary comb 10 is inserted for the convenience of the manufacturing process, the lower electrode 101*b* may be omitted.

Specifically, the lower electrode 111*b* of a metal coating layer is formed on the elastic layer 111*a*, and the upper electrode 111*c* is formed on a piezoelectric material layer of a piezoelectric single crystalline material layer or a piezoelectric ceramic material layer, and the metal coating layer may be formed of Al or Au and formed to a thickness of about 0.5 μm using a chemical vapor deposition (CVD) method or a sputtering method.

Meanwhile, the elastic layers 12, 13, 111*a* and 101*a* may be manufactured using a portion of the silicon surface or plain carbon steel.

Next, operation of the MEMS actuator in accordance with an embodiment of the present invention will be described.

Referring to FIGS. 1 to 3, when a DC voltage (for example, −5V) is uniformly applied to the metal coating layer of the movable comb 11, and a voltage (for example, 10V) having a polarity alternately varied as time goes is applied to the metal layer of a left stationary comb 10, an attractive electrostatic force is generated between the metal coating layers to allow the movable comb 11 to be pulled toward the left stationary comb 10. At this time, elasticity of the spring 12 and intensity of the voltage applied to the metal coating layer may be adjusted to control a moving distance of the movable comb 11.

When the voltage applied to the electrodes is cut off, the movable comb 11 is recovered to its original state by a restoration force of the spring. At this time, when a voltage having equal intensity and opposite polarity to the voltage applied to the electrode of the left stationary comb 10 is applied to a right stationary comb 10, a repulsive electrostatic force is generated between the movable comb 11 and the right stationary comb 10 to allow the movable comb 11 to be more pushed toward the left side.

As described above, the stationary comb 10 is symmetrically disposed at both sides of the movable comb 11 and voltages of polarity opposite to each other are applied to the combs 10 and 11 to make the electrostatic force between the electrodes of the movable comb 11 and the stationary comb 10 larger, thereby laterally driving the movable comb 11 to perform the tracking drive using the electrostatic force between the combs.

Meanwhile, a movable stage 111 of the movable comb 11 may be operated by a cantilever beam piezoelectric actuator. As shown in FIG. 3, the substrate 14 and the insulating material layer 111*d* having piezoelectric characteristics may be directly deposited or adhered by epoxy. In addition, the electrodes have a conductive metal layer coated on lower and upper surfaces of the piezoelectric ceramic layer or the piezoelectric single crystal layer to provide the cantilever beam piezoelectric actuator. Preferably, the metal coating layer is made of Al or Au widely used in a semiconductor manufacturing process.

Preferably, a poling direction formed by the piezoelectric material layer 111*d* is perpendicularly directed to a surface of the movable stage 111. Therefore, when the voltage is applied to the upper and lower surfaces of the piezoelectric material layer, volume of the piezoelectric material layer expands in lateral and longitudinal directions depending on each piezoelectric charge constant. At this time, the lower surface of the piezoelectric material layer is fixed to the silicon substrate to prevent the volume from expanding. As a result, the cantilever beam is bent up and down to perform the focusing drive. At this time, the silicon substrate functions as an elastic layer, and may be substituted with a material having excellent machining characteristics and high elastic coefficient.

EXAMPLE

Figure 4:
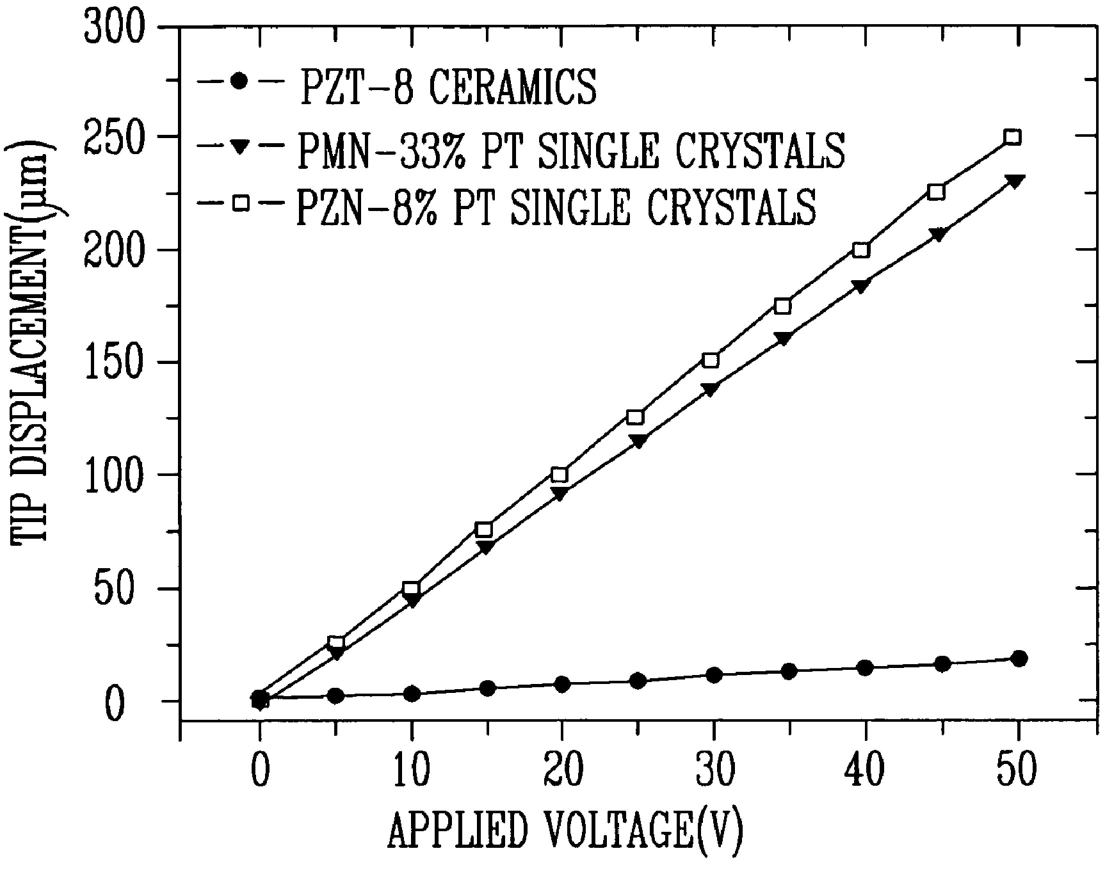
FIG. 4 is a graph representing a result of simulation of the actuator of FIG. 2.

FIG. 4 is a graph representing a result of simulation of the actuator of FIG. 2.

The graph is an analyzed result of PZT-8 ceramic, PMN-33% PT single crystals and PZN-8% PT single crystals with respect to an actuator including a cantilever beam having a length of 12 mm and a width of 2 mm, a piezoelectric layer having a thickness of 150 μm and a silicon substrate having a thickness of 40 μm, using a finite element method (FEM).

Tip displacement of the cantilever beam with respect to the voltage of 10 V applied to the upper and lower surfaces of the piezoelectric material layer was 49.7 μm in the case of the PZN-8% PT single crystals, 46.0 μm in the case of the PMN-33% PT single crystals, and 2.99 μm in the case of the PZT-8 ceramic.

As can be seen from the foregoing, the cantilever beam piezoelectric actuator in accordance with the present invention adapts the piezoelectric single crystal to enable large displacement at a low drive voltage, and adapts the movable comb stage to simultaneously perform the focusing drive as well as the tracking drive.

The actuator in accordance with the present invention may be applied as a core part of an ultra-small mobile drive apparatus requiring dual-shaft control.

The actuator in accordance with the present invention is appropriate to use in an ultra-small mobile optical disk drive apparatus having a thickness of not more than about 5 mm, since the actuator used in the ultra-small mobile optical disk drive should satisfy low power drive conditions and the actuator should have a small volume.

In addition, the actuator may be adapted to any apparatus requiring an ultra-small low power dual-shaft position control.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A microelectromechanical system (MEMS) actuator comprising:
- a stationary comb fixed on a substrate;
- a movable comb disposed separately from the substrate; and
- a spring connected to the movable comb and the substrate to resiliently support the movable comb,
- wherein the movable comb includes a piezoelectric material layer in a laminated manner to be perpendicularly moved by a piezoelectric phenomenon and laterally moved by an electrostatic force to the stationary comb.

2. The MEMS actuator according to claim 1, wherein the movable comb comprises metal coating layers, and the piezoelectric material layer interposed between the metal coating layers.

3. The MEMS actuator according to claim 1, further comprising a post for fixing the stationary comb on the substrate.

4. The MEMS actuator according to claim 3, wherein the stationary comb and the movable comb comprises the piezoelectric material layer.

5. The MEMS actuator according to claim 1, wherein the piezoelectric material layer is one of a piezoelectric ceramic layer and a piezoelectric single crystalline layer.

6. The MEMS actuator according to claim 5, wherein the piezoelectric material layer is made of one selected from PZT ceramic, PMN-PT($Pb(Mg_{1/3}Nb_{2/3})O_3$—$PbTiO_3$) ceramic, and PZN-PT($Pb(Zn_{1/3}Nb_{2/3})O_3$—$PbTiO_3$) ceramic, and the piezoelectric single crystalline layer is made of one of a PMN-PT single crystal and a PZN-PT single crystal.

7. The MEMS actuator according to claim 1, wherein the spring supporting the movable comb is formed at only one end of the movable comb.

* * * * *